US010081136B2

(12) United States Patent
Hofmann et al.

(10) Patent No.: US 10,081,136 B2
(45) Date of Patent: Sep. 25, 2018

(54) SYSTEMS AND METHODS FOR ADDITIVE MANUFACTURING PROCESSES THAT STRATEGICALLY BUILDUP OBJECTS

(71) Applicant: California Institute of Technology, Pasadena, CA (US)

(72) Inventors: Douglas C. Hofmann, Altadena, CA (US); John Paul C. Borgonia, Santa Fe Springs, CA (US)

(73) Assignee: California Institute of Technology, Pasadena, CA (US)

( * ) Notice: Subject to any disclaimer, the term of this patent is extended or adjusted under 35 U.S.C. 154(b) by 705 days.

(21) Appl. No.: 14/332,187

(22) Filed: Jul. 15, 2014

(65) Prior Publication Data
US 2015/0014885 A1 Jan. 15, 2015

Related U.S. Application Data

(60) Provisional application No. 61/846,501, filed on Jul. 15, 2013.

(51) Int. Cl.
B29C 67/00 (2017.01)
B22D 23/00 (2006.01)
B33Y 10/00 (2015.01)
B33Y 30/00 (2015.01)
B29C 64/106 (2017.01)
B29C 64/112 (2017.01)
(Continued)

(52) U.S. Cl.
CPC ........ *B29C 67/0055* (2013.01); *B22D 23/003* (2013.01); *B29C 64/106* (2017.08); *B29C 64/112* (2017.08); *B29C 64/20* (2017.08); *B29C 64/386* (2017.08); *B33Y 10/00* (2014.12); *B33Y 30/00* (2014.12)

(58) Field of Classification Search
USPC .......................................................... 264/308
See application file for complete search history.

(56) References Cited

U.S. PATENT DOCUMENTS 5,746,844 A 5/1998 Sterett et al.
5,985,204 A 11/1999 Otsuka et al.
(Continued)

FOREIGN PATENT DOCUMENTS

WO 2012083922 A1 6/2012

*Primary Examiner* — Christina Johnson
*Assistant Examiner* — Xue Liu
(74) *Attorney, Agent, or Firm* — KPPB LLP

(57) ABSTRACT

Systems and methods in accordance with embodiments of the invention implement additive manufacturing techniques that employ different sets of deposition characteristics and/or material formation characteristics during the additive manufacture of an object so as to strategically build up the object. In many embodiments, material used to build up an object is deposited at different deposition rates during the additive manufacture of the object, and the object is thereby strategically built up. In one embodiment, a method of additively manufacturing an object includes: depositing material onto a surface at a first deposition rate so as to define a first region of the object to be additively manufactured; and depositing material onto a surface at a second deposition rate so as to define a second region of the object to be additively manufactured; where the second deposition rate is different from the first deposition rate.

19 Claims, 16 Drawing Sheets

(51) Int. Cl.
  *B29C 64/20*    (2017.01)
  *B29C 64/386*   (2017.01)

(56) References Cited

U.S. PATENT DOCUMENTS

| | | | |
|---|---|---|---|
| 8,042,770 | B2 | 10/2011 | Martin et al. |
| 8,639,484 | B2 * | 1/2014 | Sun ................ B29C 67/0059 703/11 |
| 9,211,564 | B2 | 12/2015 | Hofmann |
| 2003/0052105 | A1 | 3/2003 | Nagano et al. |
| 2005/0263932 | A1 | 12/2005 | Heugel |
| 2006/0105011 | A1 * | 5/2006 | Sun ................ B29C 67/0059 424/422 |
| 2007/0228592 | A1 | 10/2007 | Dunn et al. |
| 2008/0085368 | A1 | 4/2008 | Gauthier et al. |
| 2012/0133080 | A1 * | 5/2012 | Moussa ........... B29C 67/0059 264/308 |
| 2013/0009338 | A1 * | 1/2013 | Mayer ............. B29C 67/0055 264/241 |
| 2013/0280547 | A1 | 10/2013 | Brandl et al. |
| 2013/0309121 | A1 * | 11/2013 | Prest .............. B22F 3/1055 419/7 |
| 2014/0004352 | A1 | 1/2014 | McCrea et al. |
| 2014/0048969 | A1 * | 2/2014 | Swanson .......... B29C 67/0055 264/129 |
| 2014/0070445 | A1 * | 3/2014 | Mayer ............. B29C 67/0055 264/129 |
| 2014/0141164 | A1 | 5/2014 | Hofmann et al. |
| 2014/0202595 | A1 | 7/2014 | Hofmann |
| 2014/0246809 | A1 | 9/2014 | Hofmann et al. |
| 2014/0312098 | A1 | 10/2014 | Hofmann et al. |
| 2017/0226619 | A1 | 8/2017 | Hofmann et al. |
| 2018/0119259 | A1 | 5/2018 | Hofmann et al. |

* cited by examiner

SYSTEMS AND METHODS FOR ADDITIVE MANUFACTURING PROCESSES THAT STRATEGICALLY BUILDUP OBJECTS

CROSS-REFERENCE TO RELATED APPLICATIONS

The current application claims priority to U.S. Provisional Patent Application No. 61/846,501, filed Jul. 15, 2013, the disclosure of which is hereby incorporated by reference.

STATEMENT OF FEDERAL FUNDING

The invention described herein was made in the performance of work under a NASA contract, and is subject to the provisions of Public Law 96-517 (35 USC 202) in which the Contractor has elected to retain title.

FIELD OF THE INVENTION

The present invention generally relates to additive manufacturing apparatuses and techniques.

BACKGROUND

'Additive manufacturing,' or '3D Printing,' is a term that typically describes a manufacturing process whereby a 3D model of an object to be fabricated is provided to an apparatus (e.g. a 3D printer), which then autonomously fabricates the object by gradually depositing, or otherwise forming, the constituent material in the shape of the object to be fabricated. For example, in many instances, successive layers of material that represent cross-sections of the object are deposited or otherwise formed; generally, the deposited layers of material fuse (or otherwise solidify) to form the final object. Because of their relative versatility, additive manufacturing techniques have generated much interest

SUMMARY OF THE INVENTION

Systems and methods in accordance with embodiments of the invention implement additive manufacturing techniques that employ different sets of deposition characteristics and/or material formation characteristics during the additive manufacture of an object so as to strategically build up the object. In many embodiments, material used to build up an object is deposited at different deposition rates during the additive manufacture of the object, and the object is thereby strategically built up. In one embodiment, a method of additively manufacturing an object includes: depositing material onto a surface at a first deposition rate so as to define a first region of the object to be additively manufactured; and depositing material onto a surface at a second deposition rate so as to define a second region of the object to be additively manufactured; where the second deposition rate is different from the first deposition rate.

In another embodiment, the first deposition rate is achieved by using a first deposition geometry and the second deposition rate is achieved by using a second, different, deposition geometry.

In yet another embodiment, the first region of the object includes intricate features; the second region includes blunt portions; and the second deposition rate is greater than the first deposition rate.

In still another embodiment, the first region defines a boundary surface that is to exist within the object to be additively manufactured; and the second region is a volume that is enclosed by the first region.

In yet still another embodiment, depositing material so as to define the first region occurs prior to depositing material so as to define the second region.

In a further embodiment, the first deposition rate is achieved by using point deposition; and the second deposition rate is achieved by using one of: surface deposition and volume deposition.

In a still further embodiment, any implemented surface deposition is effected by one of: depositing material in a ribbon format, and depositing material by spraying material; and any implemented volume deposition is effected by pouring material.

In a yet further embodiment, spraying material comprises one of: spraying polymer and thermal spray coating metal.

In a yet still further embodiment, the second region is defined by the entire volume enclosed by the first region.

In another embodiment, a method of additively manufacturing an object further includes, conforming the material deposited so as to define the second region to at least some portion of the boundary surface.

In yet another embodiment, the conforming is accomplished using a mechanical tool.

In still another embodiment, the second region defines at least the majority of the outer surface of the desired object.

In yet still another embodiment, the material deposited so as to define the first region of the object is different than the material deposited so as to define the second region of the object.

In a further embodiment, either the material deposited so as to define a first region of the object or the material deposited so as to define the second region of the object comprises a metallic glass-based material.

In a yet further embodiment, an additive manufacturing apparatus includes: a nozzle configured to deposit material in accordance with a first set of deposition characteristics; and a nozzle configured to deposit material in accordance with a second set of deposition characteristics.

In a still further embodiment, the nozzle configured to deposit material in accordance with a first set of deposition characteristics is also configured to deposit material in accordance with a second set of deposition characteristics.

In a still yet further embodiment, the nozzle includes an opening through which material can be extruded, wherein the geometry of the opening can be varied.

In another embodiment, the geometry of the opening is a slit with a variable length.

In yet another embodiment, the nozzle is configured to deposit material by spraying material onto a surface, wherein the spray radius can be adjusted.

In still another embodiment, the nozzle is configured to deposit material by one of: spraying polymer and thermal spray coating metal.

In still yet another embodiment, the nozzle that is configured to deposit material in accordance with a first set of deposition characteristics is a first nozzle that is different than the nozzle that is configured to deposit material in accordance with a second set of deposition characteristics, which is a second nozzle.

In a further embodiment, the first nozzle is a point source; and the second nozzle is one of: a surface source and a volume source.

In a yet further embodiment, the first nozzle is configured to deposit a ribbon of material having a first width and the second nozzle is configured to deposit a ribbon of material having a second, different, width.

In a still yet further embodiment, the first nozzle is associated with a first feedstock source and the second nozzle is associated with a second feedstock source wherein the first feedstock source is different than the second feedstock source.

In another embodiment, an additive manufacturing apparatus further includes a mechanical tool that is configured to conform deposited material to a surface.

In yet another embodiment, an additive manufacturing apparatus further includes a curing subassembly that is configured to cure deposited material.

In still another embodiment, a method of additively manufacturing an object using a plurality of different sets of deposition characteristics includes: receiving a 3-dimensional model of a desired object using a manufacturing controller; determining a strategy for additively manufacturing the object that includes employing a plurality of different sets of deposition characteristics during the additive manufacture of the object using the manufacturing controller; and instructing an additive manufacturing apparatus to additively manufacture the object in accordance with the developed additive manufacturing strategy using the manufacturing controller.

In still yet another embodiment, the plurality of different sets of deposition characteristics are based on the different sets of deposition characteristics available in the additive manufacturing apparatus.

In a further embodiment, the plurality of different sets of deposition characteristics include different deposition rates.

In a yet further embodiment, the plurality of different sets of deposition characteristics include different deposition geometries.

In a still further embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a still yet further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

In another embodiment, an additive manufacturing apparatus system includes: an additive manufacturing apparatus that is configured to implement multiple sets of deposition characteristics during the additive manufacture of an object, memory that comprises an additive manufacturing apparatus controller application, and a processor configured by the additive manufacturing apparatus controller application to: receive a 3-dimensional model of a desired object; determine a strategy for additively manufacturing the object that includes employing a plurality of different sets of deposition characteristics during the additive manufacture of the object; and instruct the additive manufacturing apparatus to additively manufacture the object in accordance with the determined additive manufacturing strategy.

In yet another embodiment, the plurality of different sets of deposition characteristics are based on the different sets of deposition characteristics available in the additive manufacturing apparatus.

In still another embodiment, the plurality of different sets of deposition characteristics include different deposition rates.

In still yet another embodiment, the plurality of different sets of deposition characteristics include different deposition geometries.

In a further embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a yet further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

In a still yet further embodiment, a machine readable medium containing processor instructions, where execution of the instructions by a processor causes the processor to perform a process comprising: receiving a 3-dimensional model of a desired object; determining a strategy for additively manufacturing the object that includes employing a plurality of different sets of deposition characteristics during the additive manufacture of the object; and instructing an additive manufacturing apparatus to additively manufacture the object in accordance with the developed additive manufacturing strategy.

In another embodiment, the plurality of different sets of deposition characteristics are based on the different sets of deposition characteristics available in a given additive manufacturing apparatus.

In yet another embodiment, the plurality of different sets of deposition characteristics include different deposition rates.

In still another embodiment, the plurality of different sets of deposition characteristics include different deposition geometries.

In a still yet another embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

DETAILED DESCRIPTION

Figure 1:
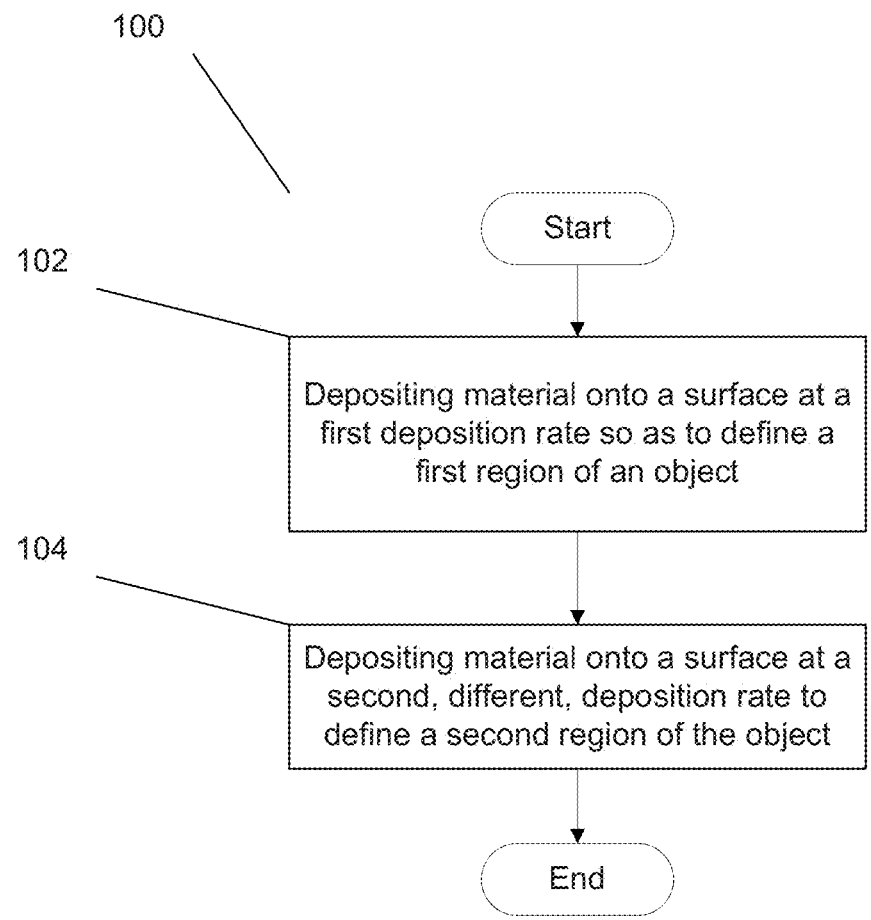
FIG. 1 illustrates a method of additively manufacturing an object using at least two different deposition rates in accordance with an embodiment of the invention.

Turning now to the drawings, systems and methods for implementing additive manufacturing techniques that employ different sets of deposition characteristics and/or material formation characteristics during the buildup of a desired object are illustrated. In the context of this application, a set of deposition characteristics and/or material formation characteristics can be understood to mean those characteristics that characterize the deposition and/or material formation that occur during the additive manufacture of an object. For example, a set of deposition characteristics can include the deposition rate and deposition geometry that characterize how a nozzle deposits material in accordance with an additive manufacturing process. A first set of deposition characteristics (and/or material formation) can be understood to be different than a second set of deposition characteristics (and/or material formation) if the first set contains at least one characteristic (e.g. a rate of deposition/material formation) that is different than the corresponding characteristic in the second set. In many embodiments, different rates of deposition and/or material formation are employed during the additive manufacture of a desired object. In a number of embodiments, the deposition and/or material formation geometry is altered during the additive manufacture of an object. In numerous embodiments, the change in the deposition geometry and/or material formation geometry alters the deposition rate and/or material formation rate during the manufacture of the desired object.

Since its inception, additive manufacturing, or '3D Printing', has generated much interest from manufacturing communities because of the seemingly unlimited potential that these fabrication techniques can offer. For example, these techniques have been demonstrated to produce any of a variety of distinct and intricate geometries, with the only input being the final shape of the object to be formed. In many instances, a 3D rendering of an object is provided electronically to a '3D Printer', which then fabricates the object. Many times, a 3D Printer is provided with a CAD File, a 3D Model, or instructions (e.g. via G-code), and the 3D Printer thereby fabricates the object. Importantly, as can be inferred, these processing techniques can be used to avoid heritage manufacturing techniques that can be far more resource intensive and inefficient. The relative simplicity and versatility of this process can pragmatically be used in any of a variety of scenarios. It should also be mentioned that the cost of 3D printers has recently noticeably decreased, thereby making additive manufacturing processes an even more viable fabrication methodology.

Given the demonstrated efficacy and versatility of additive manufacturing processes, their potential continues to be explored. For instance, while current additive manufacturing processes are typically based on the deposition/forming of conventional metals and/or polymers, there have been efforts to broaden the material selection from which to additively manufacture objects. For example, in U.S. patent application Ser. No. 14/163,936 entitled "Systems and Methods for Fabricating Objects Including Amorphous Metal Using Techniques Akin to Additive Manufacturing" to Hofmann, techniques for additively manufacturing objects from metallic glass-based materials are disclosed. The disclosure of U.S. patent application Ser. No. 14/163,936 is herein incorporated by reference in its entirety. Similarly, in U.S. patent application Ser. No. 14/259,608 entitled "Systems and Methods for Fabricating Structures Including Metallic Glass-Based Materials Using Ultrasonic Welding" to Hofmann et al., techniques for using ultrasonic welding to additively manufacture objects from metallic glass-based materials are disclosed. The disclosure of U.S. patent application Ser. No. 14/259,608 is herein incorporated by reference in its entirety.

Additionally, although additive manufacturing processes demonstrate desirable versatility, there exists room for improvement with respect to the rate and efficiency at which these processes fabricate objects. Generally, additive manufacturing processes build up an object by effectively 'raster scanning' a nozzle head that deposits, or otherwise forms, the material for each layer of the object. In effect, the object is built up by sequentially depositing, or otherwise forming, a nominal portion of the object until it is fully developed. As can be appreciated, this can be a time consuming process. This is particularly the case given the overall favor of 3d printers having 'increased resolution'—increasing the resolution of 3d printers effectively amounts to decreasing the amount of material deposited/formed as the nozzle head 'raster scans' to create the desired object. In other words, for a given raster-scanned path traversal, a 3d printer having increased resolution deposits/forms a lesser amount of material. This can allow objects having relatively finer and more intricate features to be additively manufactured, but at the expense of the rate of fabrication.

Against this background, there have been some efforts to develop additive manufacturing techniques to expedite the fabrication rates of conventional additive manufacturing processes. For example, in U.S. patent application Ser. No. 14/196,628 entitled "Systems and Methods Implementing Additive Manufacturing Processes that Utilize Multiple Build Heads", Hofmann et al. disclose additive manufacturing apparatus that include multiple nozzle heads attached to a single translation system such that each nozzle head traverses a similar path during the build up of a desired object; as a result, multiple objects can be simultaneously fabricated. The disclosure of U.S. patent application Ser. No. 14/196,628 is hereby incorporated by reference in its entirety.

Nonetheless, even with these laudable achievements, the state of the art can further benefit from the development of methods that can enable the efficient build up of objects. Accordingly, in many embodiments, different sets of deposition and/or material formation characteristics are implemented during the additive manufacture of an object so as to strategically build up the object. For instance, in many embodiments, methods of additively manufacturing an object are implemented where the rate of material deposition/formation is strategically varied so as to build up an object at a relatively more rapid rate. For example, in some embodiments, the intricate portions of an object are built up by depositing/forming material more meticulously, while the blunt portions of the object are built up by depositing/forming material at a more rapid rate. In some embodiments, a bounding surface of an object to be fabricated is meticulously built up in accordance with an additive manufacturing process, and the interior volume is thereafter formed by depositing/forming material within the bounding surface at a bulk rate. Note that throughout the application, references to material 'deposition/formation' are meant to regard the material that solidifies during an additive manufacturing process and thereby facilitates the fabrication of a desired object, unless otherwise stated.

In many embodiments, the geometry of the material as it is deposited/formed is controlled so as to make the additive manufacturing process more efficient. In numerous embodiments, the geometry of the deposited/formed material is controlled so as to control the rate of deposition/formation. For instance, in many embodiments, where it is desired that certain portions of an additively manufactured object be built up carefully, nominal amounts of material can be meticulously deposited/formed; conversely, where it is desired that a comparatively greater amount of material be deposited/formed, a planar ribbon of material can be deposited/formed. Similarly, where it is desired that an even greater amount of material be deposited to form the object, then the material can be deposited/formed in bulk. In this paradigm, the deposition/formation of a nominal amount of material (e.g. like the amount of material deposited by conventional additive manufacturing apparatuses) can be understood to be 'point deposition/formation' or else deposition/formation by a 'point source'; the deposition/formation of material in a planar format can be understood to be 'surface deposition', or else deposition/formation by a 'surface source', and the deposition/formation of material in a bulk format (e.g. where the material has non-negligible length in each of three dimensions as it is being deposited) can be understood to be 'volume deposition/formation', or else deposition/formation by a volume source.

Note that these techniques can be implemented in conjunction with existing additive manufacturing processes such as for example direct metal laser sintering (DMLS), laser engineered net shaping (LENS), and electron beam freeform fabrication techniques (EBF$^3$). By way of background, in DMLS additive manufacturing, a bed of feedstock metallic powder is spread over a substrate, and a build head is used to heat, and thereby form, a layer of the structure to be formed; after that layer of the structure is formed, a subsequent bed of feedstock metallic powder is deposited, and the next structural layer is formed. This process iterates until the final structure is formed; any excess feedstock metallic powder is removed. In LENS additive manufacturing, a feedstock metallic powder is provided to a build head that heats and deposits the feedstock metal into the shape of the structure to be formed. EBF$^3$ additive manufacturing processes are similar to LENS additive manufacturing processes, except that feedstock metal is in the form of wire, and an electron beam is typically used to heat the wire. Of course, while metal-based additive manufacturing technologies are discussed, the above described techniques can be implemented in conjunction with polymer-based additive manufacturing processes as well. Indeed, the above-described additive manufacturing techniques can be incorporated in conjunction with any suitable additive manufacturing process and in conjunction with any suitable material (e.g. ceramics and waxes), and is not so constrained.

In many embodiments, additive manufacturing apparatuses are implemented that have the capability of varying the material deposition/formation characteristics during the additive manufacture of an object. In numerous embodiments, additive manufacturing apparatuses are implemented that can deposit/form material at different deposition/formation rates. For example, in some embodiments, an additive manufacturing apparatus includes multiple nozzle heads, each of which being capable of depositing/forming material at a different rate of deposition/formation. For instance, in some embodiments, an additive manufacturing apparatus includes a nozzle that is configured to implement point deposition/formation; a nozzle head that is configured to implement surface deposition/formation; and a nozzle head that is configured to implement volume deposition/formation.

In a number of embodiments, processes are implemented that develop an additive manufacturing strategy—based on varying the deposition/formation characteristics during the additive manufacturing process—for a given object to be fabricated. These processes can be implemented by any of a variety of computation devices, and can thereby be implemented as software. The processes can further include instructing the operation of additive manufacturing apparatuses that are capable of depositing/forming material using different sets of deposition characteristics so that a desired object is additively manufactured in accordance with the determined additive manufacturing strategy. These methods, systems, and processes are now discussed in greater detail below.

Additive Manufacturing Methods Based on Different Material Deposition/Formation Rates In many embodiments, material deposition/formation characteristics in an additive manufacturing process are varied so as to efficiently build up a desired object. In a number of embodiments, the rate of the material deposition/formation and/or the geometry of material deposition/formation is varied during the buildup of an object during an additive manufacturing process. The material deposition/formation characteristics can be varied based on the geometry of the object to be fabricated. For example, where an object includes both intricate features and blunt portions, the additive manufacture of the object can include additively manufacturing the intricate features using deposition/formation characteristics that can allow the intricate features to be carefully developed, and—during the same additive manufacturing process—can further include using distinctly different deposition/formation characteristics that can allow the blunt portions, which may not require as much care, to be more rapidly developed.

FIG. 1 illustrates a method of additively manufacturing an object that employs different deposition rates to efficiently build up the object in accordance with an embodiment of the invention. In particular, the method 100 includes depositing (102) material onto a surface at a first deposition rate in accordance with an additive manufacturing process so as to define a first region of the object, and depositing (104) material onto a surface at a second, different, deposition rate as part of the same additive manufacturing process. As alluded to above, the different deposition rates can be based on the geometry of the object to be fabricated. For example, a slower, more meticulous, deposition rate can be implemented to develop a first region that includes the intricate features of the desired object, whereas a more rapid deposition rate can be implemented to build up the second region that includes the blunt portions of the fabricated object. Intricate features can be characterized in that they possess at least some characteristic dimension (e.g. length, width, height) that is less than some determined threshold value. For instance in many embodiments, the determined threshold value is approximately 5 mm. Of course it should be clear that the determined threshold value can be any suitable threshold value. Blunt portions can be understood to mean portions that have at least two characteristic dimensions (e.g. length, width, height) that are each larger than determined respective threshold values. In many embodiments, the determined threshold value for each of the respective dimensions is 1 cm. Of course it should be clear that the determined threshold value can be any suitable threshold value.

As mentioned above, these techniques can be implemented in conjunction with any suitable additive manufacturing process. For example, they can be implemented in conjunction with a DMLS process: a fine sintering tool can be used to sinter the feedstock powder and thereby deposit material at a first deposition rate so as to define a first region of an object, and a different blunt tool can be used to sinter feedstock powder at a second, faster, deposition rate so as to define a second region of the object. Of course, as mentioned above, these techniques can be implemented in conjunction with any suitable additive manufacturing process, including for example LENS, EBF$^3$, polymer-based additive manufacturing processes, ceramic-based additive manufacturing processes, and wax-based additive manufacturing processes.

While the above discussion regards additive manufacturing processes implementing a plurality of deposition rates, a plurality of any suitable deposition characteristic can be implemented in accordance with embodiments of the invention. For example in many embodiments, additive manufacturing processes are implemented whereby at least two different deposition geometries are implemented. For instance, in some embodiments, material is deposited onto a surface using a first deposition geometry (e.g. a ribbon having a first width) to define a first region of an object, and material is deposited onto a surface using a second deposition geometry (e.g. a ribbon having a second width) to define a second region of the object. Moreover, as can be appreciated, the above-described method is broad and can be implemented in any number of ways. For example, in many embodiments, a boundary surface of an additively manufactured object is deposited, and an interior volume of the boundary surface is thereafter filled at a comparatively higher deposition rate—this aspect is now discussed in greater detail below.

Figure 2:
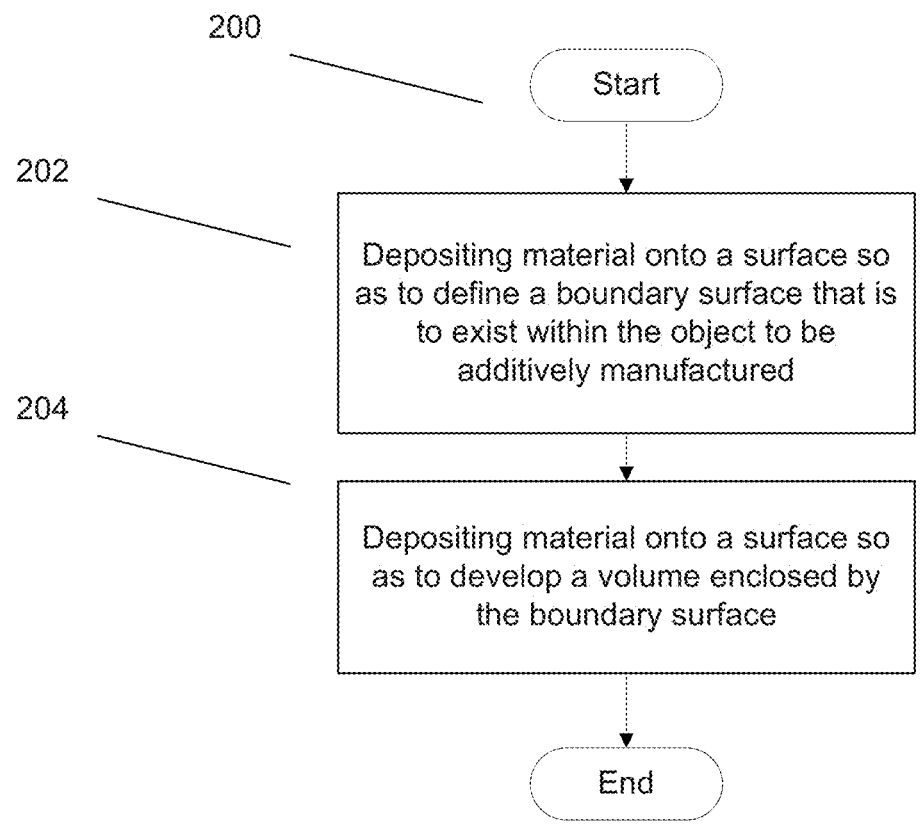
FIG. 2 illustrates a method of additively manufacturing an object by depositing material onto a surface so as to define a boundary surface, and thereafter filling an interior volume enclosed by the boundary surface in accordance with an embodiment of the invention.

Additive Manufacturing Methods that Include Forming a Boundary Surface and Thereafter Forming a Volume Enclosed by the Boundary Surface In many embodiments, an additive manufacturing method includes developing a boundary surface of the object to be fabricated, and thereafter developing a volume enclosed by the boundary surface with material. This method can greatly expedite the development of the interior volume. FIG. 2 depicts a method of additively manufacturing an object whereby a boundary surface is additively manufactured, and an interior volume within the boundary surface is thereafter filled. In particular, the method 200 includes depositing (202) material onto a surface so as to define a boundary surface that is to exist within the object to be additively manufactured. For example, a perimeter surface of a desired object can be manufactured. The method 200 further includes depositing (204) material onto a surface so as to develop a volume enclosed by the boundary surface. In effect, with the boundary surface defined, an interior volume within the boundary surface, the interior volume can be built up more rapidly, for example. In many instances, the interior volume that is developed is the entire volume enclosed by the boundary surface.

Figure 3A:
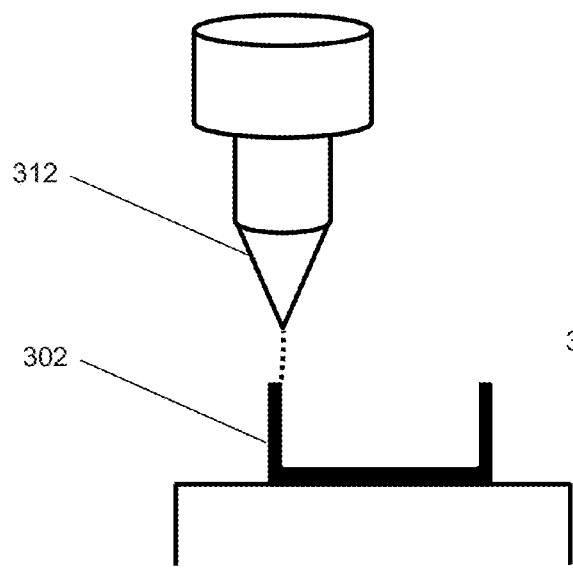
FIGS. 3A-3D illustrate the additive manufacture of an object by first depositing material onto a surface so as to define a boundary surface, and thereafter filling an interior volume enclosed by the boundary surface in accordance with an embodiment of the invention.
Figure 3B:
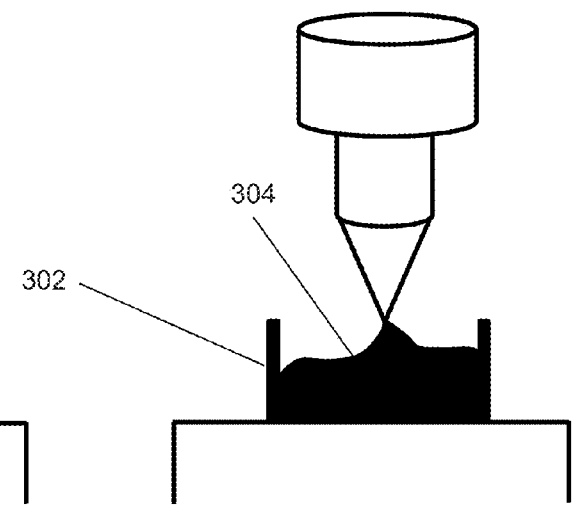
Figure 3C:
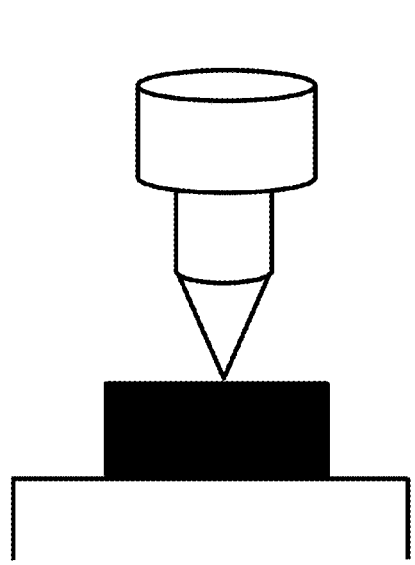
Figure 3D:
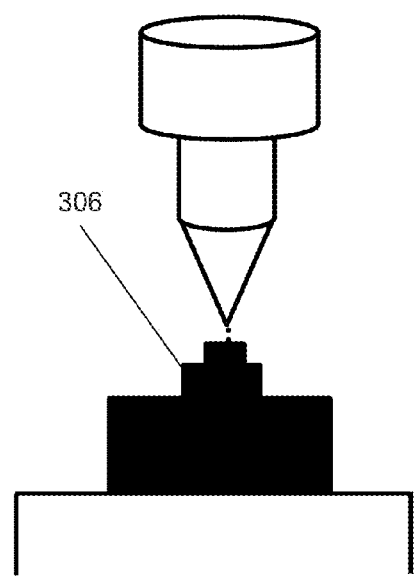

FIGS. 3A-3D illustrate the fabrication of an object consistent with the method described above with respect to FIG. 2 in accordance with an embodiment of the invention. In particular, FIG. 3A depicts the deposition of material so as to define a boundary surface 302 of the object to be fabricated. More specifically, FIG. 3A depicts that a nozzle 312 is carefully depositing material to build up the boundary surface 302. FIG. 3B depicts the deposition of material so as to build up the entire interior volume 304 defined by the boundary surface 302. Note that FIG. 3B depicts that material is being deposited at a relatively rapid rate—the temporary uneven nature of the deposition of the interior volume ultimately bears no consequence. FIG. 3C depicts that the volume has been filled, and this portion of the object has been fabricated. FIG. 3D depicts that more intricate features can thereafter be developed on the bulk developed region; at this point, the intricate features can be more carefully developed.

Figure 4A:
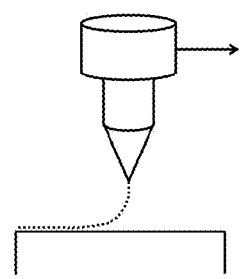
FIGS. 4A-4E illustrate various deposition techniques, each having a different set of deposition characteristics that can be implemented in accordance with embodiments of the invention.
Figure 4B:
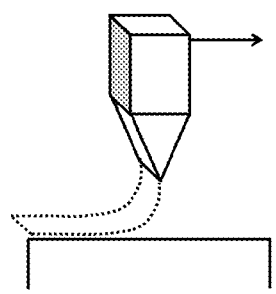
Figure 4C:
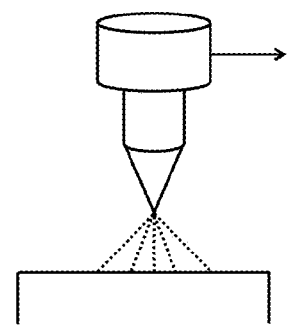
Figure 4D:
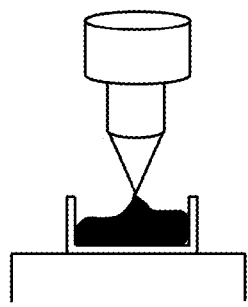
Figure 4E:
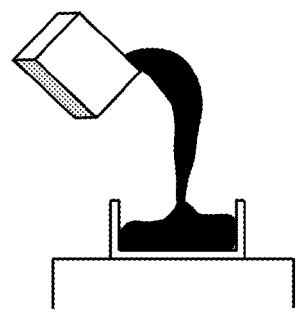

While the above methods have referenced implementing different deposition rates, note that the different deposition rates can be achieved in any of a number of ways. For instance, in many embodiments, the deposition rate is controlled by implementing a different deposition geometry. For example, FIGS. 4A-4E depict varying deposition characteristics that can impact the rate of deposition. In particular, FIG. 4A depicts using a nozzle head to deposit a nominal amount of material; this is similar to the way many conventional additive manufacturing apparatuses fabricate objects—in other words, the nozzle acts as a 'point source'. Any conventional nozzle head can be implemented as a point source in accordance with embodiments of the invention. FIG. 4B depicts using a nozzle head to deposit a ribbon of material; in other words, the nozzle is configured to implement 'surface deposition' and can be said to be acting as a 'surface source'. For example, in many embodiments, nozzle heads that are configured to deposit metals or metallic glass-based materials in a ribbon form factor and ultrasonically weld them (for example, using the techniques described in U.S. patent application Ser. No. 14/259,608, incorporated by reference above) may be utilized in accordance with certain embodiments. FIG. 4C depicts using a nozzle head to spray a material onto a surface—this nozzle too thereby implements surface deposition. For example, any of the spray-techniques described in U.S. patent application Ser. No. 14/163,936, incorporated by reference above, can be implemented, including, but not limited to, thermal spraying, high velocity oxy-fuel spraying, plasma spraying, wire arc spraying, and mixtures thereof. Of course the spraying of polymer may also be implemented. FIG. 4D depicts using a nozzle head to deposit material in bulk—'volume deposition'—and can be said to be acting as a 'volume source'. FIG. 4E depicts depositing material in bulk using a pouring mechanism. Of course, pouring mechanisms can be used in conjunction with any suitable material in accordance with embodiments of the invention. For example, in many embodiments, they are used in conjunction with one of molten bulk metallic-glass based compositions, molten metals, and molten polymers. As can be appreciated, any of the above-mentioned deposition devices can be incorporated in accordance with embodiments of the invention. More generally, any suitable deposition device can be incorporated in accordance with embodiments of the invention. Further, deposition devices can be used to deposit any suitable material, including but not limited to metals, polymers, ceramics, waxes, and metallic glass-based materials in accordance with embodiments of the invention. Indeed, in many embodiments, the additive manufacture of an object involves the deposition of a plurality of distinct materials. It should be reiterated that the described methods, systems, and processes are meant to be broad and can be implemented in conjunction with any of a variety of additive manufacturing processes.

Figure 5A:
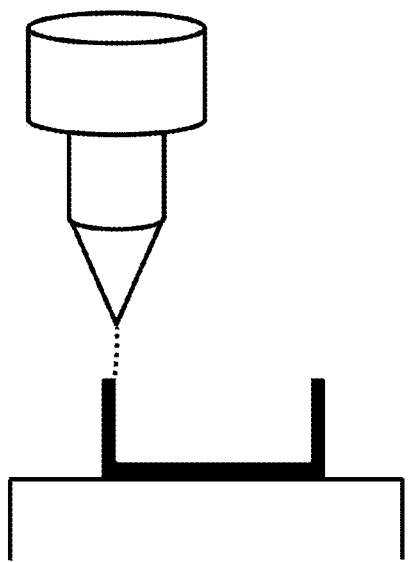
FIGS. 5A-5D illustrate the additive manufacture of an object by first depositing material onto a surface so as to define a boundary surface, and thereafter filling an interior volume enclosed by the boundary surface by spraying material in accordance with an embodiment of the invention.
Figure 5B:
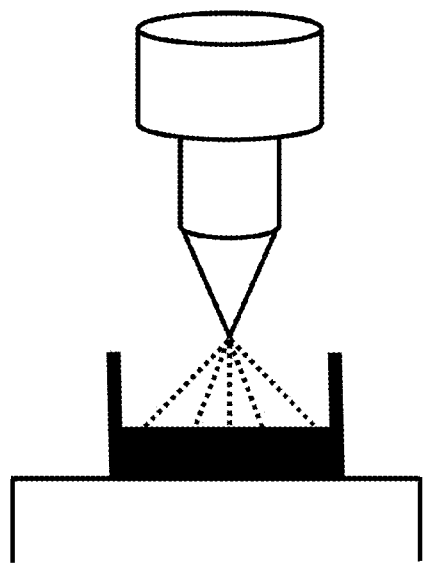
Figure 5C:
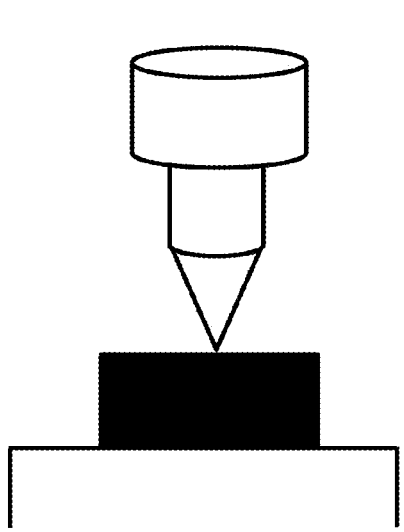
Figure 5D:
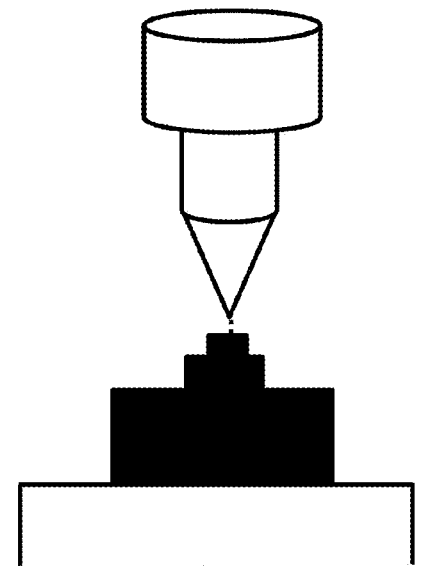

FIGS. 5A-5D depict additively manufacturing an object in accordance with the method described above with respect to FIG. 2. In particular, FIGS. 5A-5D are similar to FIGS. 3A-3D except that FIG. 5B depicts that material is sprayed into the interior volume. Of course, it should be appreciated that any way of depositing material into an interior volume enclosed by a boundary surface can be implemented in accordance with embodiments of the invention. For example, molten material can be poured into an interior volume enclosed by a boundary surface. As alluded to above, the molten material can be any suitable material, including for example a metallic glass-based composition, a metal, and a polymer. As can be appreciated, the after pouring, the molten material can be made to solidify using any suitable corresponding technique. For example, molten metallic glass-based material can be rapidly cooled using any suitable technique, e.g. conductive cooling through any adjacent bounding surface, cooling via convection, using a distinct cooling gas, etc.

Figure 6A:
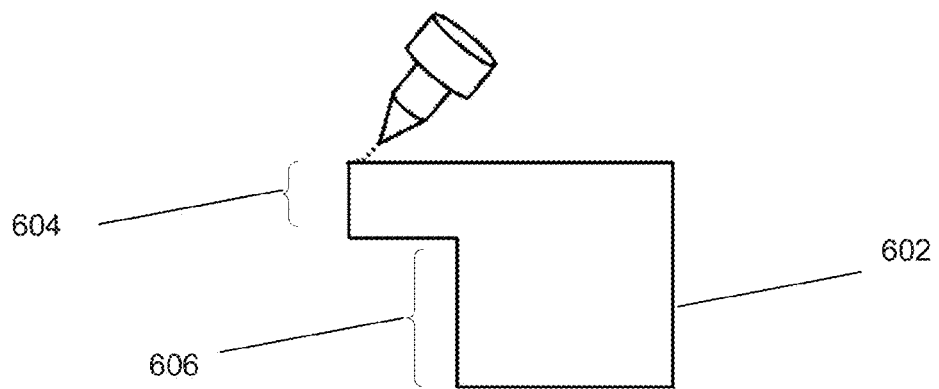
FIGS. 6A-6C illustrate the additive manufacture of an object by first depositing material onto a surface so as to define a boundary surface, and thereafter filling a first interior volume by depositing material in the form of a surface having a first width, and filling a second interior volume by depositing material in the form of a surface having a second width in accordance with an embodiment of the invention.
Figure 6B:
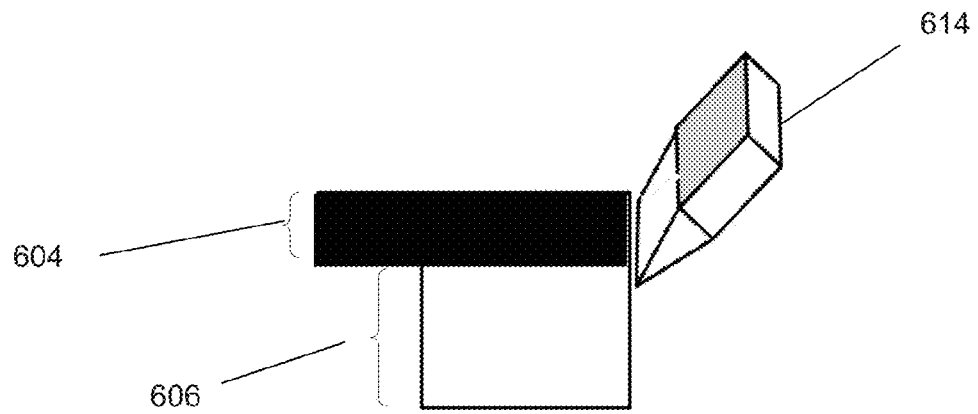
Figure 6C:
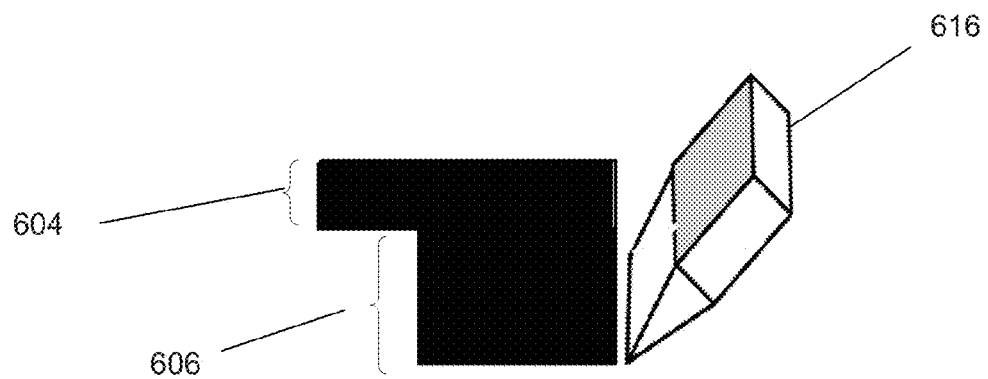

In many embodiments, a deposition geometry is applied such that it accommodates the geometry of the part to be fabricated. For instance, FIGS. 6A-6C depict depositing material based on the geometry of the desired object. In particular, in the illustrated embodiment, the object is fabricated in accordance with the description above with respect to FIG. 2. Specifically, FIG. 6A depicts that a boundary surface 602 of the object to be manufactured is fabricated. Note that the object has a thin portion 604 and a wide portion 606. FIG. 6B depicts a surface deposition is used to develop the internal volume that corresponds with the thin portion 602 of the object. More specifically, a nozzle 614 that is a surface source is depositing a ribbon having a width that accommodates the thin portion 602. FIG. 6C depicts a surface deposition by a nozzle 616 that deposits a ribbon of material having a width that accommodates the wide portion 606. In effect, by conforming the deposition geometry to the geometry of a desired object, its manufacture can be made to be more efficient.

Figure 7A:
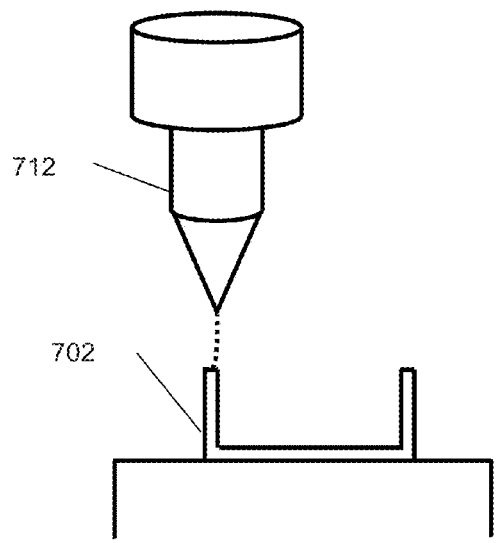
FIGS. 7A-7D illustrate the additive manufacture of an object by first depositing material onto a surface so as to define a boundary surface, filling an interior volume enclosed by the boundary surface, and removing the material defining the interior volume in accordance with an embodiment of the invention.
Figure 7B:
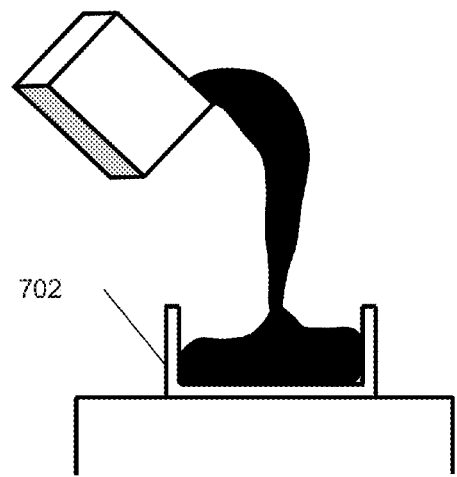
Figure 7C:
Figure 7D:
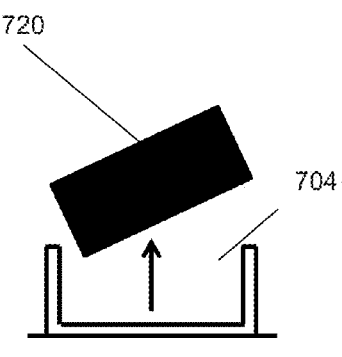

In many embodiments, a boundary surface is additively manufactured such that the interior volume of the boundary surface defines the shape of the desired object. For example, FIGS. 7A-7D illustrate the fabrication of an object in accordance with the method described above with respect to FIG. 2, where the desired object is defined by the interior volume defined by the boundary surface. More specifically, FIG. 7A depicts the fabrication of a boundary surface 702 using a point source 712. FIG. 7B depicts that the entire interior volume 704 defined by the boundary surface 702 is filled by pouring material into the volume 704. FIG. 7C depicts that the entire interior volume 704 has been filled by material. FIG. 7D depicts that the material that has filled the entire interior volume defined by the boundary surface has solidified and is removed to yield the desired object. Each of these processes can be implemented by a single additive manufacturing apparatus according to a single additive manufacturing process in accordance with embodiments of the invention.

Figure 8A:
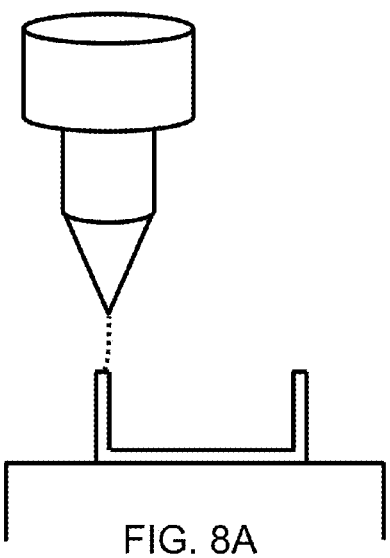
FIGS. 8A-8F illustrate using a mechanical tool to conform added material to a boundary surface in accordance with an embodiment of the invention.
Figure 8B:
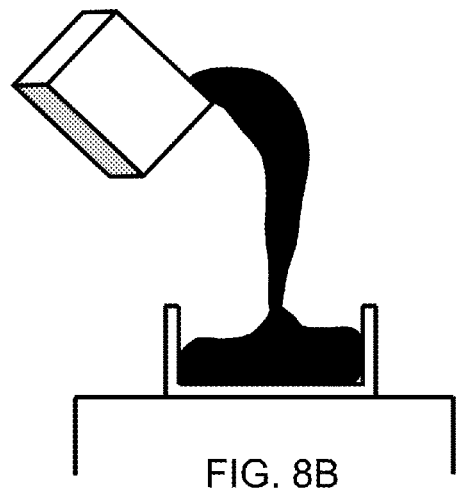
Figure 8C:
Figure 8D:
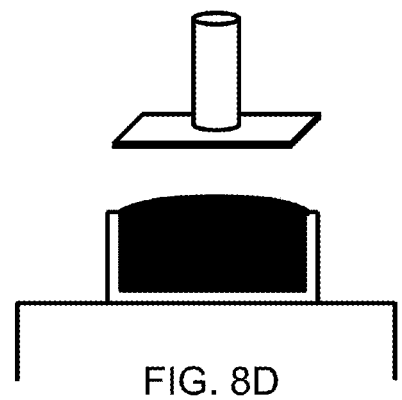
Figure 8E:
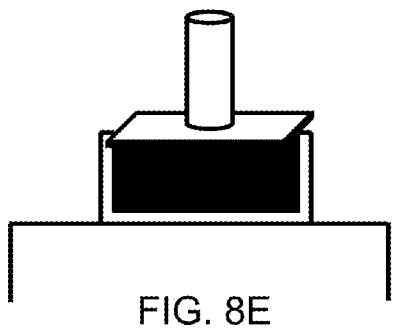
Figure 8F:
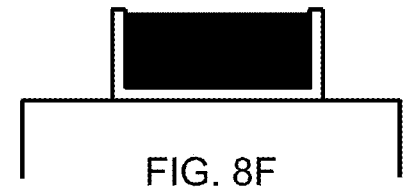

Of course, one of ordinary skill in the art would appreciate that the above described techniques can be varied in any number of ways in accordance with embodiments of the invention. For instance in many embodiments, a mechanical tool is used to compress deposited material so that it more tightly conforms to volume defined by the boundary surface. FIGS. 8A-8F depict using a mechanical tool to facilitate the conformance of deposited material to an additively manufactured boundary surface. In particular, FIG. 8A depicts the fabrication of a boundary surface; FIG. 8B depicts pouring material into the volume enclosed by the boundary surface; FIG. 8C depicts how the poured in material is not perfectly level with the top of the boundary surface; FIG. 8D depicts that a mechanical tool is used to force the material into the volume defined by the boundary surface; FIG. 8E depicts that the mechanical tool is used to force the material into the volume defined by the boundary surface; and FIG. 8F depicts that the material has been forced into the volume defined by the boundary surface. In effect, the use of a mechanical tool can enhance the fidelity of the final object While the above descriptions provide methods for additively manufacturing techniques, it should be clear the listed methods can be modified in any number of ways in accordance with embodiments of the invention. For instance, in many embodiments, the methods further include curing the deposited material. Moreover, while the above descriptions have regarded techniques for additively manufacturing objects, in many embodiments, additive manufacturing apparatuses are provided that can vary the deposition/material formation characteristics during the additive manufacture of a single object. These aspects are now discussed in greater detail below.

Additive Manufacturing Apparatuses that can Vary Deposition and/or Material Formation Characteristics During Additive Manufacturing Processes In many embodiments, additive manufacturing apparatuses that can vary deposition and/or material formation characteristics during additive manufacturing processes are provided. For instance, in many embodiments, additive manufacturing apparatuses include at least two nozzles that are each characterized by different rates of material deposition. In a number of embodiments, additive manufacturing apparatus include at least two nozzles that are each characterized in that they employ different deposition geometries. In numerous of embodiments, additive manufacturing apparatuses include at least two nozzles that each characterized in that they employ a different deposition geometry and thereby a different rate of deposition.

Figure 9:
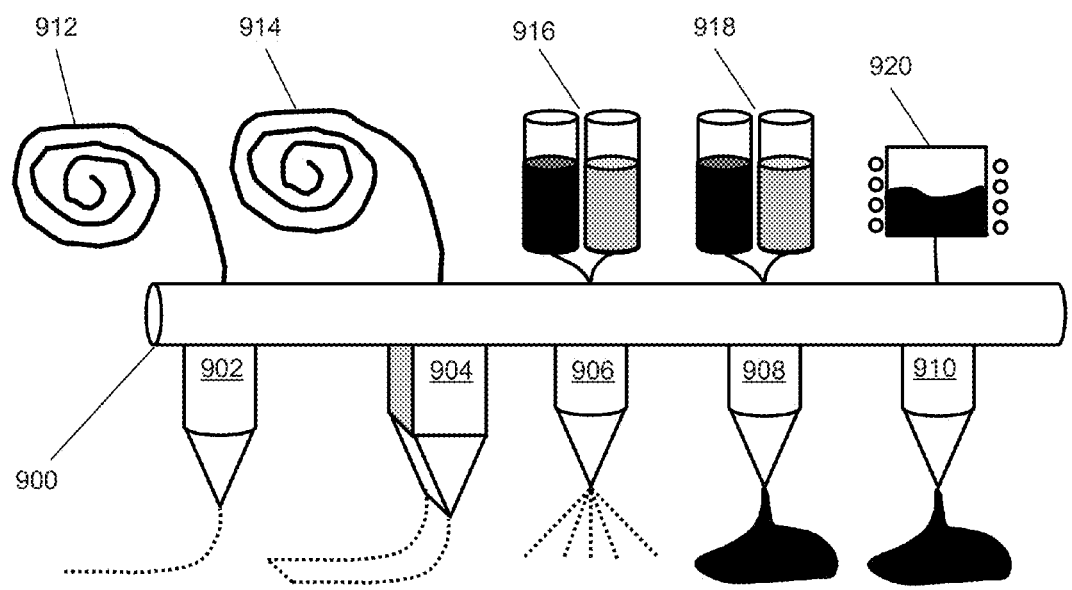
FIG. 9 illustrates the build head of an additive manufacturing apparatus that includes multiple different nozzles, each characterized by a different set of deposition characteristics, in accordance with an embodiment of the invention.

For example, FIG. 9 depicts a build head of an additive manufacturing apparatuses that includes a plurality of nozzle heads that are each characterized by different sets of deposition characteristics in accordance with embodiments of the invention. In particular, the illustrated embodiment depicts that the build head 900 includes a first nozzle 902 that acts as a point source, a second nozzle 904 that acts as a surface source by depositing a ribbon of material, a third nozzle 906 that acts as a surface source by spraying material, and fourth and fifth nozzles that act as a volume source by depositing material in bulk. In the illustrated embodiment, each of the nozzle heads are coupled with respective feedstock sources. In particular, each of the first and second nozzle heads 902 and 904 are coupled to respective feedstock wire 912 and 914. Each of the third nozzle head 906 and the fourth nozzle head 908 are coupled to respective liquid polymer reservoirs 916 and 918 that quickly cure upon the mixing of the two initially separated polymeric materials (when the material is deposited, the two separated materials are mixed and thereby quickly cure such that they solidify). The fifth nozzle head 910 is coupled to a molten polymer reservoir 920. Accordingly, as each of the nozzles are within a single additive manufacturing apparatus, the above-described additive manufacturing methods can be implemented, e.g. additive manufacturing processes can be implemented that employ different sets of deposition characteristics during the additive manufacture of an object.

Figure 10A:
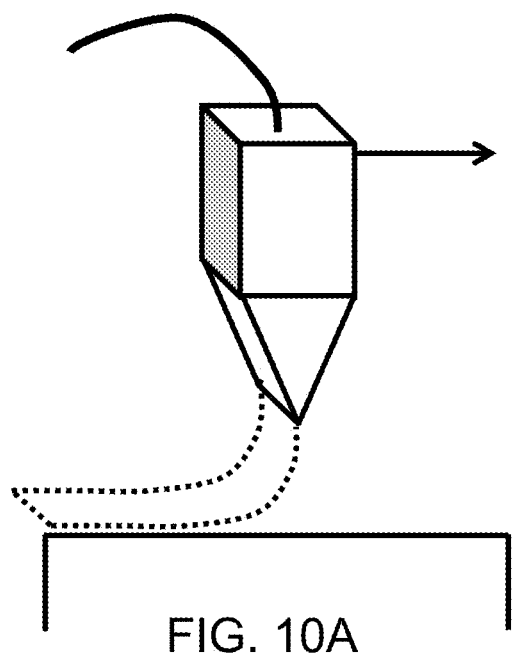
FIGS. 10A-10B illustrate nozzles each configured to deposit material in a surface format, but with different widths in accordance with an embodiment of the invention.
Figure 10B:
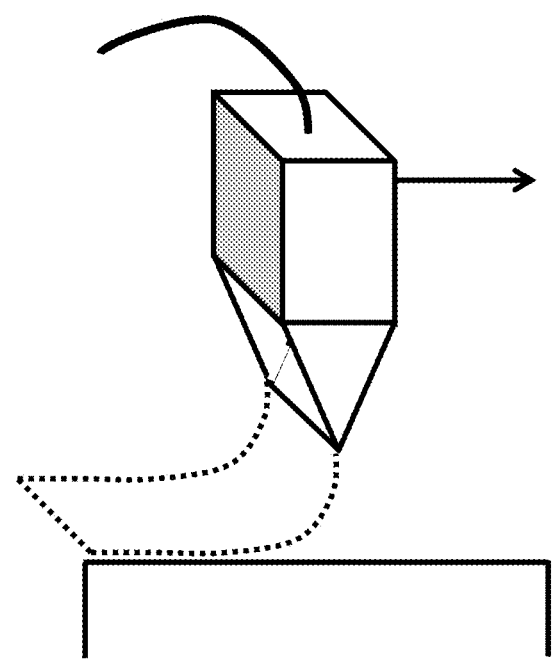

While FIG. 9 depicts nozzles that are configured to deposit polymeric materials, it should be clear that the nozzles can be configured to deposit any of a variety of materials—e.g. any of those listed above (metallic glass-based materials, metals, polymers, ceramics, waxes, etc.)—in accordance with embodiments of the invention. It should also be appreciated that, although certain nozzles are depicted, any of a variety of different types of nozzles can be incorporated in accordance with embodiments of the invention. For instance, in some embodiments, an additive manufacturing apparatus includes nozzles configured to deposit ribbons of different widths. FIGS. 10A and 10B depict nozzle heads configured to deposit ribbons of different widths. In particular, FIG. 10A depicts a nozzle head configured to deposit a ribbon of a given width, and FIG. 10B depicts a nozzle head configured to deposit a ribbon having a greater width. Note that the nozzle depicted in FIG. 10B will generally consume more feedstock material per distance travelled than the nozzle depicted in FIG. 10A. Similarly, relative to when the nozzle heads are moving at the same rate, the nozzle depicted in FIG. 10B will generally consume more feedstock wire per unit time than that seen in FIG. 10A. Recall that, as discussed above (e.g. with respect to FIGS. 6A-6C), being able to deposit ribbons of different geometries may be beneficial insofar as the differently sized ribbons can better suit the buildup of particular geometries.

Figure 11A:
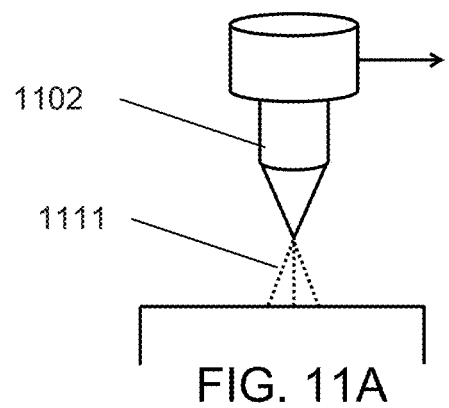
FIGS. 11A-11C illustrate a nozzle having a variable spray radius in accordance with an embodiment of the invention.
Figure 11B:
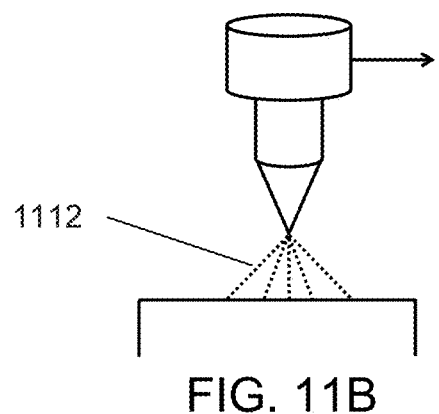
Figure 11C:
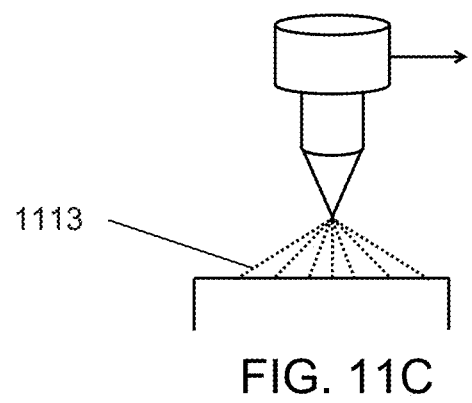

In many embodiments, an additive manufacturing apparatus includes a nozzle that can vary its deposition geometry. For instance, in a number of embodiments, a nozzle that is configured to deposit material in a ribbon form factor (and thereby acts as a surface source) can control the width of its opening such that the width of the extruded ribbon can be controlled. In many embodiments, a nozzle that is configured to deposit material in a surface form factor by spraying material can have its spray radius controlled such that the characteristic length of the applied material can be controlled. For example, FIGS. 11A-11C depict a nozzle can have its spray radius controlled, and can thereby have its deposition geometry controlled. In particular, FIG. 11A depicts that the nozzle 1102 is spraying material in accordance with a first spray radius 1111. FIG. 11B depicts that the nozzle 1102 has been adjusted so that it is spraying material in accordance with a second spray radius 1112 that is larger than the first spray radius. And FIG. 11C depicts that the nozzle 1102 is spraying material in accordance with an even larger spray radius 1113. In this way, it is seen that the deposition geometry can be adjusted within a single nozzle in accordance with certain embodiments of the invention. As can be appreciated, the nozzle can be moved away from the working surface to increase the spray diameter in accordance with embodiments of the invention.

Figure 12:
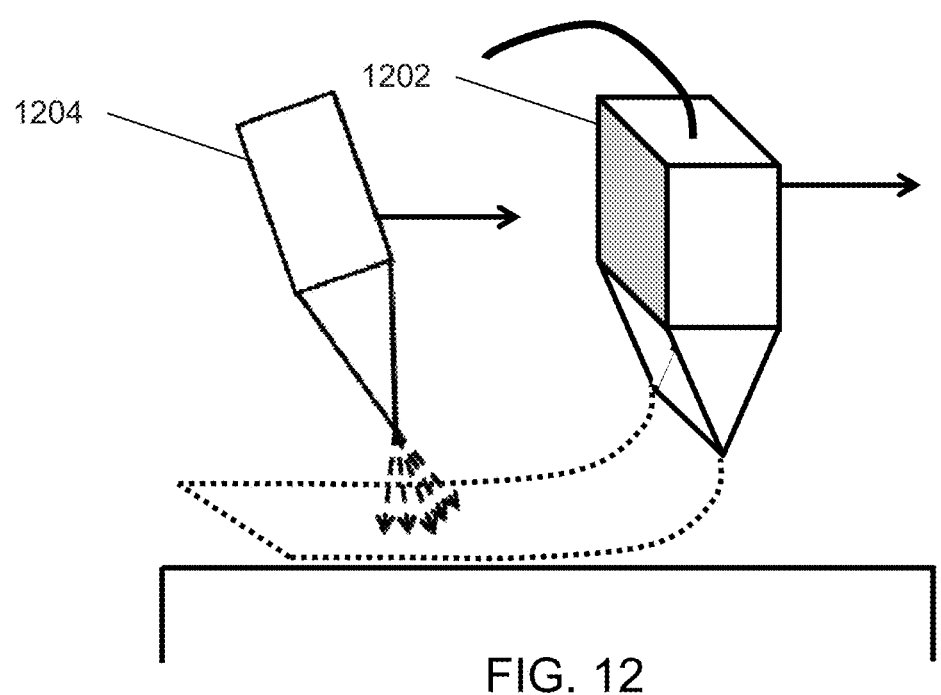
FIG. 12 illustrates the incorporation of a curing subassembly in conjunction with an additive manufacturing apparatus that is configured to implement multiple sets of deposition characteristics in accordance with an embodiment of the invention.

In many embodiments, other additive manufacturing subassemblies are used in conjunction with the above described aspects. For instance in many embodiments, an additive manufacturing apparatus that can implement a range of deposition characteristics includes a curing subassembly that cures deposited material. For example, FIG. 12 depicts an additive manufacturing apparatus whereby a surface source 1202 is used in conjunction with a curing subassembly 1204 that can cure deposited ribbon. Of course, it should be clear that any of a variety of subassemblies can be in incorporated in conjunction with additive manufacturing apparatuses that can implement multiple deposition characteristics. For example, a cooling subassembly may be incorporated. In a number of embodiments, an additive manufacturing apparatus includes a mechanical tool configured to conform deposited pliable material to an already deposited boundary surface, such as that depicted in FIGS. 8A-8F. In these ways, additive manufacturing apparatus can be made to be particularly versatile and comprehensive.

Of course, it should be appreciated, that the additive manufacturing apparatuses described above can be modified in any suitable way in accordance with embodiments of the invention. For instance, in some embodiments, a single heating element may be used to prepare feedstock material prior to deposition. For example, where an additive manufacturing apparatus includes a wire feedstock material and feedstock material in the form of a molten material, a single heating source—e.g. a laser or a resistive heating element— may be used to treat the feedstock material prior to its deposition. In some embodiments, the additive manufacturing apparatus further includes subtractive manufacturing subassemblies, e.g. mills. The inclusion of subtractive manufacturing subassemblies can further bolster the versatility of an additive manufacturing apparatuses. Of course, while several examples are given, it should be appreciated that any number of variations can be implemented in accordance with embodiments, of the invention. The discussed examples are meant to be illustrative and not comprehensive.

Importantly, it should be understood that the operation of the above-described additive manufacturing apparatuses can be controlled by any suitable controller—the controller that controls the operation of the additive manufacturing apparatus can be understood to be a 'manufacturing controller'. In many embodiments, the manufacturing controller can be implemented via a computation device such as a desktop personal computer, a laptop computer, a tablet computer, or can be embedded onto the apparatus itself. While certain examples are given, the manufacturing controller can of course be implemented in any suitable way in accordance with embodiments of the invention. As can be appreciated, the manufacturing controller can receive and/or compute instructions for controlling the operation of the additive manufacturing apparatus.

While the above discussions have regarded additive manufacturing techniques and additive manufacturing apparatuses relating to implementing varying deposition characteristics during the additive manufacture of objects, in many embodiments, processes for determining additive manufacturing strategies that rely on employing different sets of deposition characteristics and controlling additive manufacturing apparatuses in accordance with the determined strategies are provided, and these are discussed in greater detail below.

Processes for Determining the Efficient Additive Manufacture of an Object Based on Utilizing Different Deposition Characteristics In many embodiments, processes for determining the efficient additive manufacture of an object based on the utilization of different sets of deposition characteristics are provided. In many embodiments, these processes are implemented by a manufacturing controller associated with an additive manufacturing apparatus. In numerous embodiments, a provided 3-dimensional model is analyzed to determine a strategy for the additive manufacture of the object based on employing different sets of deposition characteristics during the additive manufacture. The determination of the strategy can be made based on known available deposition characteristics, based on the geometry of the provided model, and/or based on the material(s) used in the buildup of the object. For example, in many embodiments, where it is known that the additive manufacture of an object can involve point deposition and surface deposition, the determined additive manufacturing strategy can include identifying intricate portions of the object, identifying blunt portions of the object, and determining to use the point source to fabricate the intricate portions of the desired object and the surface source to build up the blunt portions of the desired object. In some embodiments, where it is given that the additive manufacture of an object will involve point deposition and volume deposition, the determination of the additive manufacturing strategy can include identifying a boundary surface of the desired object, identifying a corresponding interior volume enclosed within the boundary surface, and determining that the additive manufacture of the object include manufacturing the boundary surface using the point source, and thereafter manufacturing the interior volume using the volume source.

Figure 13:
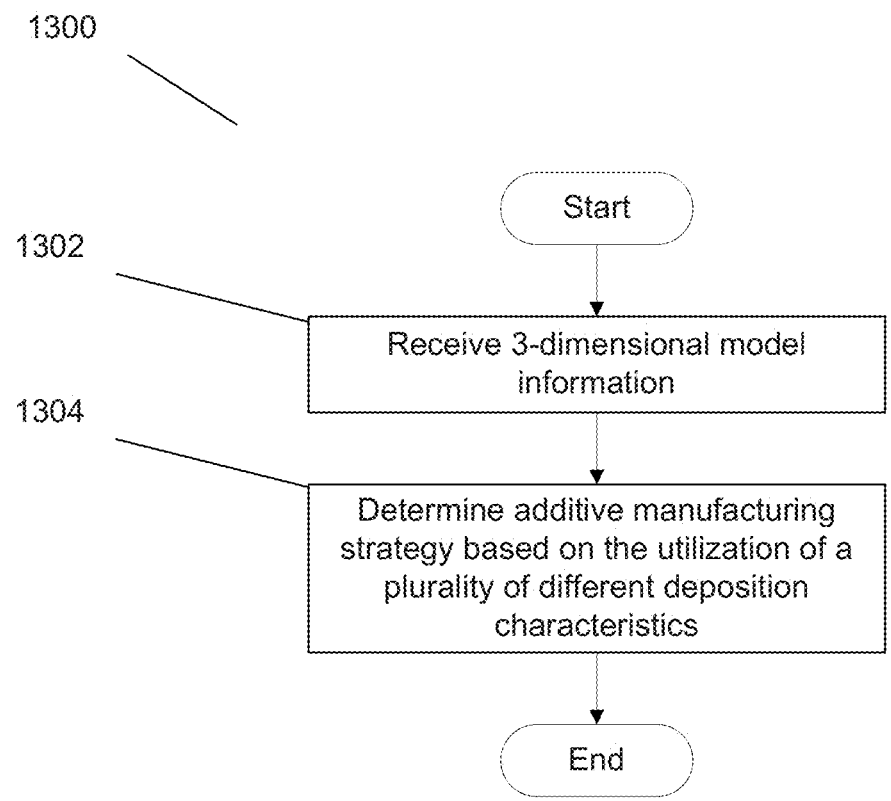
FIG. 13 illustrates a process for determining an additive manufacturing strategy based on utilizing a plurality of different sets of deposition characteristics in accordance with an embodiment of the invention.

FIG. 13 illustrates a process of determining the efficient additive manufacture of an object based on the utilization of different deposition characteristics in accordance with an embodiment of the invention. In particular, the process 1300 includes receiving (1302) receiving 3-dimensional model information of a desired object. In many instances, the process 1300 is performed by a manufacturing controller, a desktop computer, a laptop computer, a tablet computer, a cell phone, or any other device capable of computation. Accordingly, the model can be received (1302) by the computation device in any suitable form. For example, the 3-dimensional model information can be received as any of a variety of computer-aided design (CAD) file formats; the model information can also be input by a user (e.g. a user can draft the 3-dimensional model on the computation device); in some embodiments, a physical model exists, and the model is scanned using an associated scanning device and thereby received by the computation device. The process 1300 can further include determining (1304) an additive manufacturing strategy based on the utilization of a plurality of different sets of deposition characteristics. As can be appreciated, the determination (1304) can be made so as to result in the efficient additive manufacture of the received model. In many instances, the determination (1304) is effected by analyzing the geometry of the received model and thereby determining an additive manufacturing strategy in view of the known available sets of deposition characteristics. The additive manufacturing strategy can be determined (1304) based on the utilization of any of a variety of different sets of deposition characteristics including, but not limited to, utilizing different deposition rates and/or different deposition geometries. In many embodiments, determining (1304) the additive manufacturing strategy accounts for the deposited material that is used during the additive manufacture of the object. For example, where both polymeric materials and metallic materials are used during the additive manufacture of an object, the deposition of polymeric materials may benefit from the implementation of certain deposition techniques, and the deposition of metallic materials may benefit from other deposition techniques. More generally, the illustrated process can be varied in any number of ways and remain within the scope of embodiments of the invention.

Figure 14:
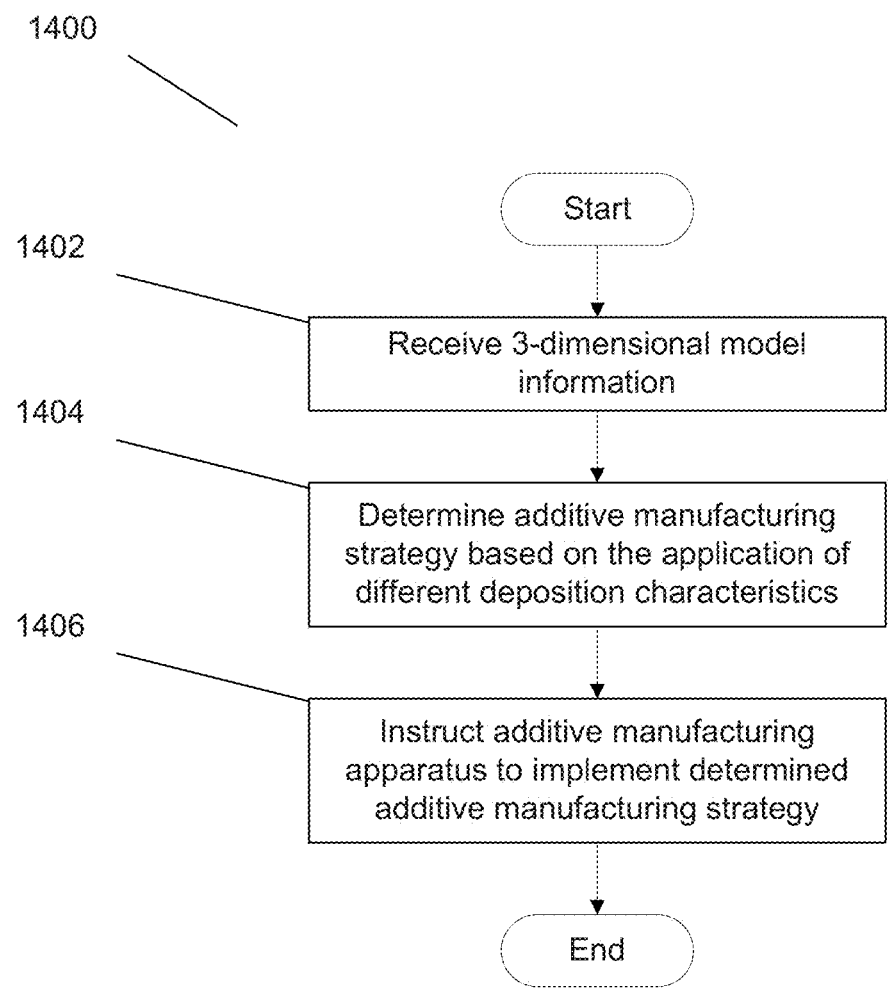
FIG. 14 illustrates a process for implementing a determined additive manufacturing strategy based on utilizing a plurality of different sets of deposition characteristics in accordance with an embodiment of the invention.

In many instances, processes for determining an efficient additive manufacturing strategy for a given model that utilize multiple deposition characteristics are effected by instructing an additive manufacturing apparatus to implement the determined strategy so as to manufacture the given model. In many embodiments, the processes are implemented by a manufacturing controller associated with an additive manufacturing apparatus, where the manufacturing controller determines the additive manufacturing strategy. For example, FIG. 14 illustrates a process for implementing a determined additive manufacturing strategy based on the utilization of a plurality of different sets of deposition characteristics where the process is implemented by a manufacturing controller which instructs the associated additive manufacturing apparatus to implement the determined strategy in accordance with an embodiment of the invention. In particular, the process is similar to that described above with respect to FIG. 13, except that the process 1400 further includes instructing (1406) an additive manufacturing apparatus to implement a determined additive manufacturing strategy to fabricate the object associated with the received model. More specifically, a manufacturing controller receives (1402) 3-dimensional model information, the manufacturing controller determines (1404) an additive manufacturing strategy, and the manufacturing controller instructs (1406) the associated additive manufacturing apparatus to implement the determined additive manufacturing strategy. In many embodiments, the additive manufacturing strategy is determined (1404) based on the sets of deposition characteristics that are available on the associated additive manufacturing device.

Figure 15:
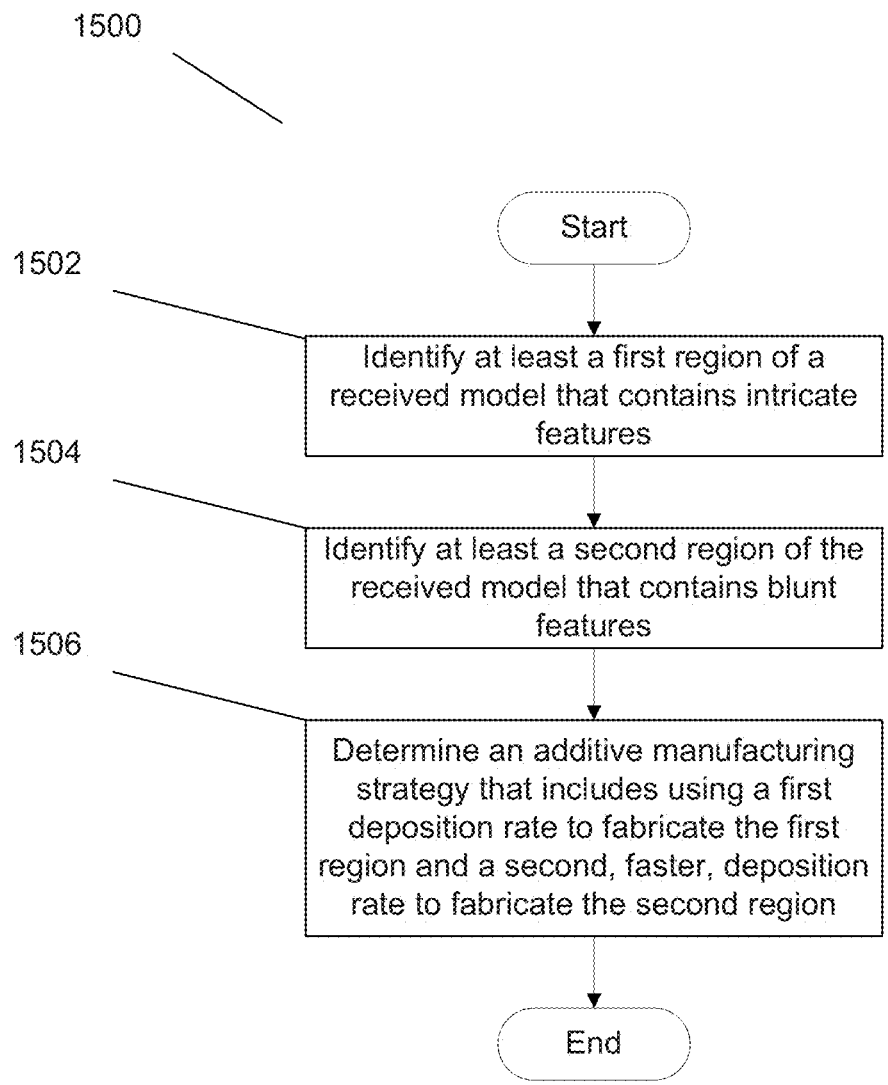
FIG. 15 illustrates a sub-process for determining an additive manufacturing strategy based on implementing different deposition rates for intricate features and bulk portions in accordance with an embodiment of the invention.

Note that the above-mentioned determination of additive manufacturing strategies can be achieved in any suitable way in accordance with embodiments of the invention. For instance, FIG. 15 illustrates a sub-process for determining an additive manufacturing strategy based on employing different deposition rates for intricate features and blunt portions. Intricate features can be characterized in that they possess at least some characteristic dimension (e.g. length, width, height) that is less than some determined threshold value. For instance in many embodiments, the determined threshold value is approximately 5 mm. Of course it should be clear that the determined threshold value can be any suitable threshold value. Blunt portions can be understood to mean portions that have at least two characteristic dimensions (e.g. length, width, height) that are each larger than determined respective threshold values. In many embodiments, the determined threshold value for each of the respective dimensions is 1 cm. Of course it should be clear that the determined threshold value can be any suitable threshold value. The illustrated sub-process 1500 includes identifying (1502) at least a first region of a received model that contains intricate features. The sub-process 1500 further includes identifying (1504) at least a second region of the received model that contains blunt features. The sub-process 1500 further includes determining (1506) an additive manufacturing strategy that includes implementing a first deposition rate in the fabrication of the first region, and a second, faster, deposition rate in the fabrication of the second region. As can be appreciated, the sub-process 1500 can be implemented by any suitable mechanism including any suitable computation device, e.g. a computer, a tablet, cell phone, or the manufacturing controller. In numerous embodiments, the determination (1506) of an additive manufacturing strategy accounts for known available deposition characteristics. For instance, where the sub-process is performed in conjunction with an associated additive manufacturing apparatus, the determination can be made in view of the additive manufacturing apparatus's available deposition characteristics. For example, where it is known that a point source and a surface source are available for the additive manufacture of the object, the determination (1506) of the additive manufacturing strategy can involve specifying that the first region be additively manufactured using the point source, while the second region be additively manufactured using the surface source. Of course, it should be clear that the determination (1506) can account for any of a variety of deposition characteristics, not just those relating to point sources and surface sources. For example, it can be specified that deposition characteristics associated with a pouring mechanism are available.

In many embodiments, the determination (1506) of an additive manufacturing strategy includes specifying a particular tool path that a nozzle (or other mechanism configured to deposit material) of an additive manufacturing apparatus is to traverse. For example, the determination (1506) of an additive manufacturing strategy can involve concluding the specific path to be traversed by the point source to build up the first region, as well as the specific path to be traversed by the surface source to build up the second region. Moreover, the determination (1506) of the additive manufacturing strategy can involve concluding the sequence of these specific paths to be traversed by the point source and the surface source respectively. For example, it can be concluded that the blunt features be deposited prior to the intricate features. The determination of sequence can be based on any of a variety of factors including, but not limited to, the goal to derive a sequence that will result in the stability of the object as it is being built up.

While the discussion above with respect to FIG. 15 regards determining an additive manufacturing strategy based on deposition rates, in many embodiments an additive manufacturing strategy is concluded based on deposition geometries. For example, in many embodiments, the geometry of a provided 3d model is analyzed in view of available deposition geometries, and an additive manufacturing strategy is thereby determined. For instance, where a model includes two rectangular regions, one having a first width, and the other having a second, wider, width, and nozzles are available that can deposit ribbons of material having widths that correspond to the widths of the rectangular regions, additive manufacturing strategies can be determined that regard using the respective nozzles to additively manufacture the corresponding regions. As can be appreciated, any number of variations of the above-described processes can be implemented in accordance with embodiments of the invention. Moreover, the recited processes are broad and can be implemented in any number of ways in accordance with embodiments of the invention.

Figure 16:
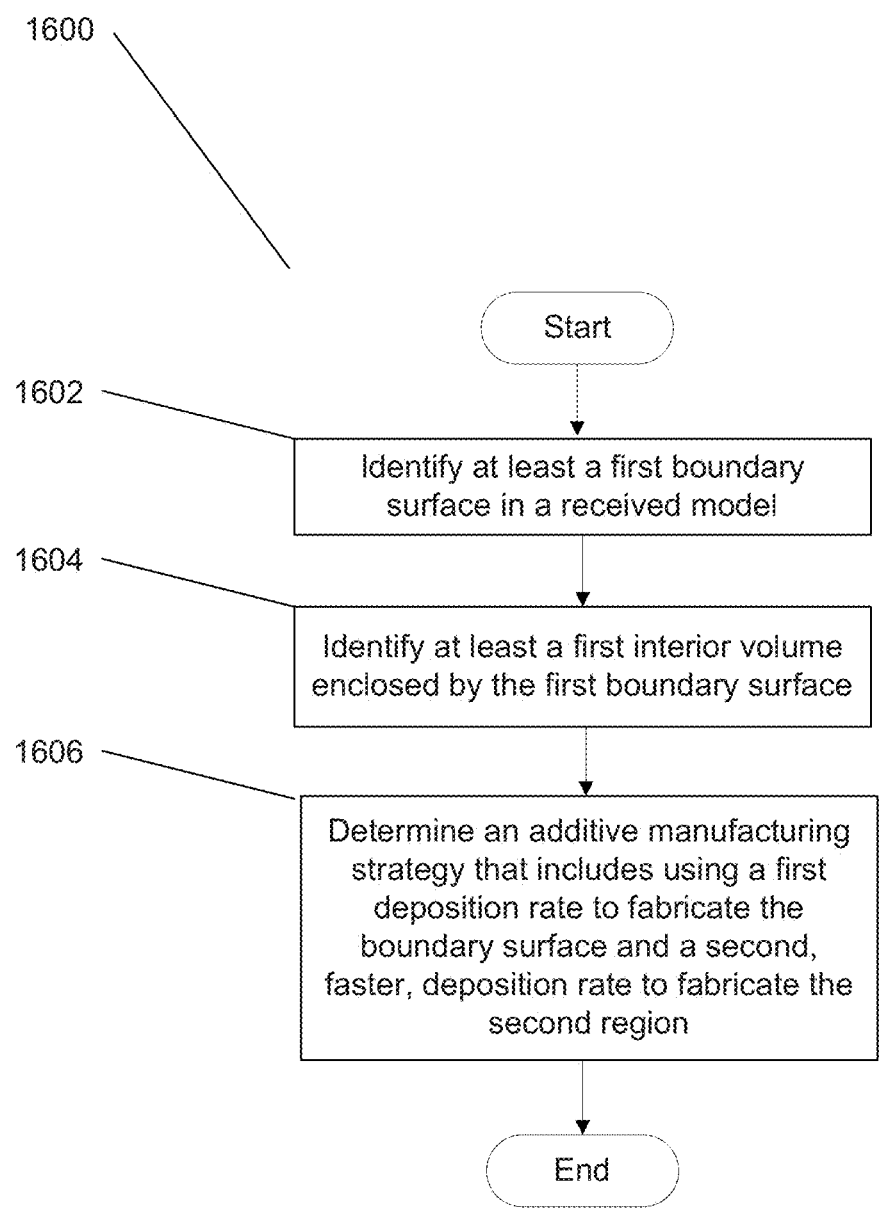
FIG. 16 illustrates a sub-process for determining an additive manufacturing strategy based on implementing different deposition rates for boundary surfaces and corresponding interior volumes in accordance with an embodiment of the invention.

In many embodiments, a sub-process for determining the efficient additive manufacture of an object include identifying boundary surfaces and corresponding interior volumes, and using appropriate deposition characteristics to build up each respective region. For example, FIG. 16 illustrates a sub-process for determining the efficient additive manufacture of an object based on the identification of boundary surfaces and corresponding interior volumes. In particular, the sub-process 1600 includes identifying (1602) at least a first boundary surface in a received model. For example, a perimeter surface can be identified (1602). The method 1600 further includes identifying (1604) at least a first interior volume enclosed by the boundary surface. In many embodiments the interior volume is the entire volume enclosed by the boundary surface. The method 1600 further includes determining (1606) an additive manufacturing strategy that includes using a first deposition rate in the additive manufacture of the boundary surface, and a second, faster, deposition rate in the additive manufacture of the interior volume. As before, in many embodiments, determining (1606) the additive manufacturing strategy includes specifying the path of traversal and identifying particular deposition characteristics. Additionally as before, in many embodiments, determining an additive manufacturing strategy is effected in view of known available deposition characteristics. While two sub-processes for determining an efficient additive manufacturing strategy are explicitly discussed, it should be clear that the determination of an additive manufacturing strategy can be accomplished using any of a variety of sub-processes in accordance with embodiments of the invention. For instance, as alluded to previously, the determination of an additive manufacturing strategy can include identifying suitable deposition geometries that accommodate the geometry of the desired object.

As can be appreciated the above-described processes can be implemented by any of a variety of non-transitory computer readable media (e.g. firmware or software) that contains processor instructions, where execution of the instructions by the processor causes the processor to implement the above-described processes. Thus, for example, firmware or software can be used in conjunction with the manufacturing controller to implement the above-described processes. Accordingly, in many embodiments, non-transitory computer readable media is provided. Further, in many embodiments, additive manufacturing apparatus systems are provided that include an additive manufacturing apparatus, memory, and a processor configured via an additive manufacturing apparatus controller application stored in the memory to implement the above-described processes.

As can be gleaned from the discussion above, the systems and methods described above can be implemented in any of a variety of ways consistent with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of additively manufacturing an object comprising:
    obtaining a 3-dimensional model of an object using a manufacturing controller;
    mapping the model of the object by dividing the object into one or more boundary regions, wherein the perimeter of each boundary region is defined by a three-dimensional boundary surface enclosing a contiguous volume region that is to exist within the object to be manufactured, wherein the one or more boundary regions reproduce the entirety of the object;
    additively depositing material onto a surface through a point deposition process at a first deposition rate to define the boundary surface of at least one boundary region of the object;
    depositing material within the volume region of the at least one boundary region through one of either a surface deposition process or a volume deposition process at a second deposition rate, so as to fill the associated volume of the at least one boundary region of the object to be additively manufactured;
    repeating the depositing steps to form each boundary region; and
    wherein the second deposition rate is faster than the first deposition rate.

2. The method of claim 1, wherein the surface deposition is selected from the group consisting of: ribbon deposition, and spraying deposition, and wherein the volume deposition is a pouring process.

3. The method of claim 1, wherein:
    the boundary surface of the object includes features of 1 cm or less.

4. The method of claim 1,
    further comprising at least a second boundary region defining a second boundary surface that is to exist within the object to be additively manufactured; and
    a second volume enclosed by the second region.

5. The method of claim 4, wherein the second region is deposited atop the first region.

6. The method of claim 1, wherein:
    a volume deposition one of either a spraying or pouring technique is used to fill the volume region.

7. The method of claim 1, wherein the spraying technique comprises one of: spraying polymer and thermal spray coating metal.

8. The method of claim 4, wherein the second region is disposed within the volume enclosed by the first boundary region.

9. The method of claim 1 further comprising conforming the material deposited within the volume to the height of the boundary surface.

10. The method of claim 9, wherein the conforming is accomplished using a mechanical tool.

11. The method of claim 4, wherein the second region defines an outer surface of the desired object.

12. The method of claim 4, wherein the material deposited so as to define the first region of the object is different than the material deposited so as to define the second region of the object.

13. The method of claim 4, wherein either the material deposited so as to define a first region of the object or the material deposited so as to define the second region of the object comprises a metallic glass-based material.

14. A method of additively manufacturing an object using a plurality of different sets of deposition characteristics comprising:
    obtaining a 3-dimensional model of an object using a manufacturing controller;
    mapping the model of the object by dividing the object into one or more boundary regions, wherein the perimeter of each boundary region is defined by a three-dimensional boundary surface enclosing a contiguous volume region that is to exist within the object to be manufactured, wherein the one or more boundary regions reproduce the entirety of the object;
    determining a strategy for additively manufacturing the one or more boundary regions of the object that includes employing a plurality of different sets of deposition characteristics during the additive manufacture of the object using the manufacturing controller; and
    instructing an additive manufacturing apparatus to additively manufacture the boundary surface of the object in accordance with a point deposition process in accordance with the developed additive manufacturing strategy using the manufacturing controller;
    depositing material within the volume region of the at least one boundary region through one of either a surface deposition process or a volume deposition process at a second deposition rate, so as fill the associated volume of the at least one boundary region of the object; and
    repeating the depositing step for each of the boundary regions of the object.

15. The method of claim 14, wherein the volume deposition process is selected from the group consisting of spray deposition or pouring.

16. The method of claim 14, wherein the deposition rate use to form the boundary surface is lower than the deposition rate used to fill the volume.

17. The method of claim 14, wherein the deposition techniques used to form the boundary surface and the volume are separate and distinct.

18. The method of claim 14, wherein
    the boundary surface comprises features having dimensions less than 1 cm.

19. The method of claim 14, wherein determining the additive manufacturing strategy comprises:

identifying at least a second boundary surface in the model;
identifying at least a second interior volume enclosed by the second boundary surface.

* * * * *